Oct. 23, 1928.  
P. H. LYNCH  
COTTON PLANTER  
Filed Feb. 20, 1926  
1,688,934  
7 Sheets-Sheet 7
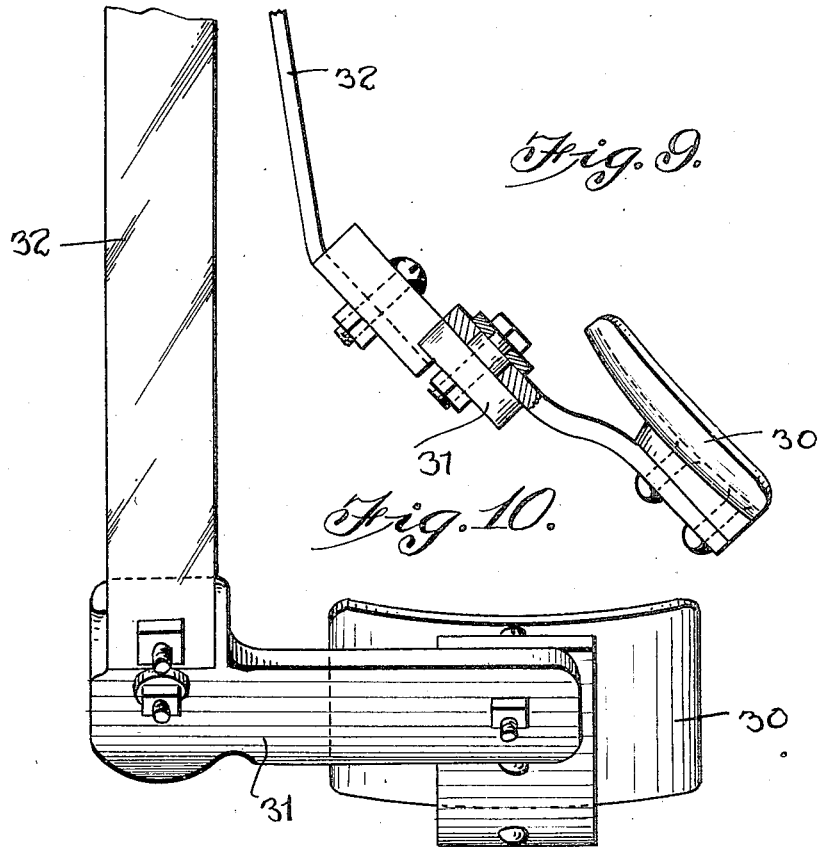
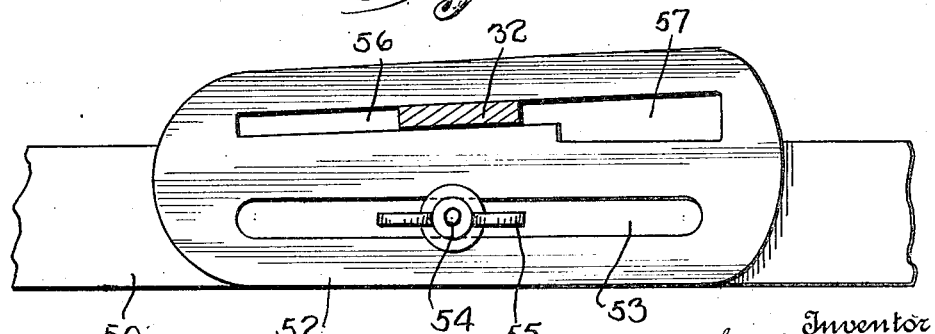

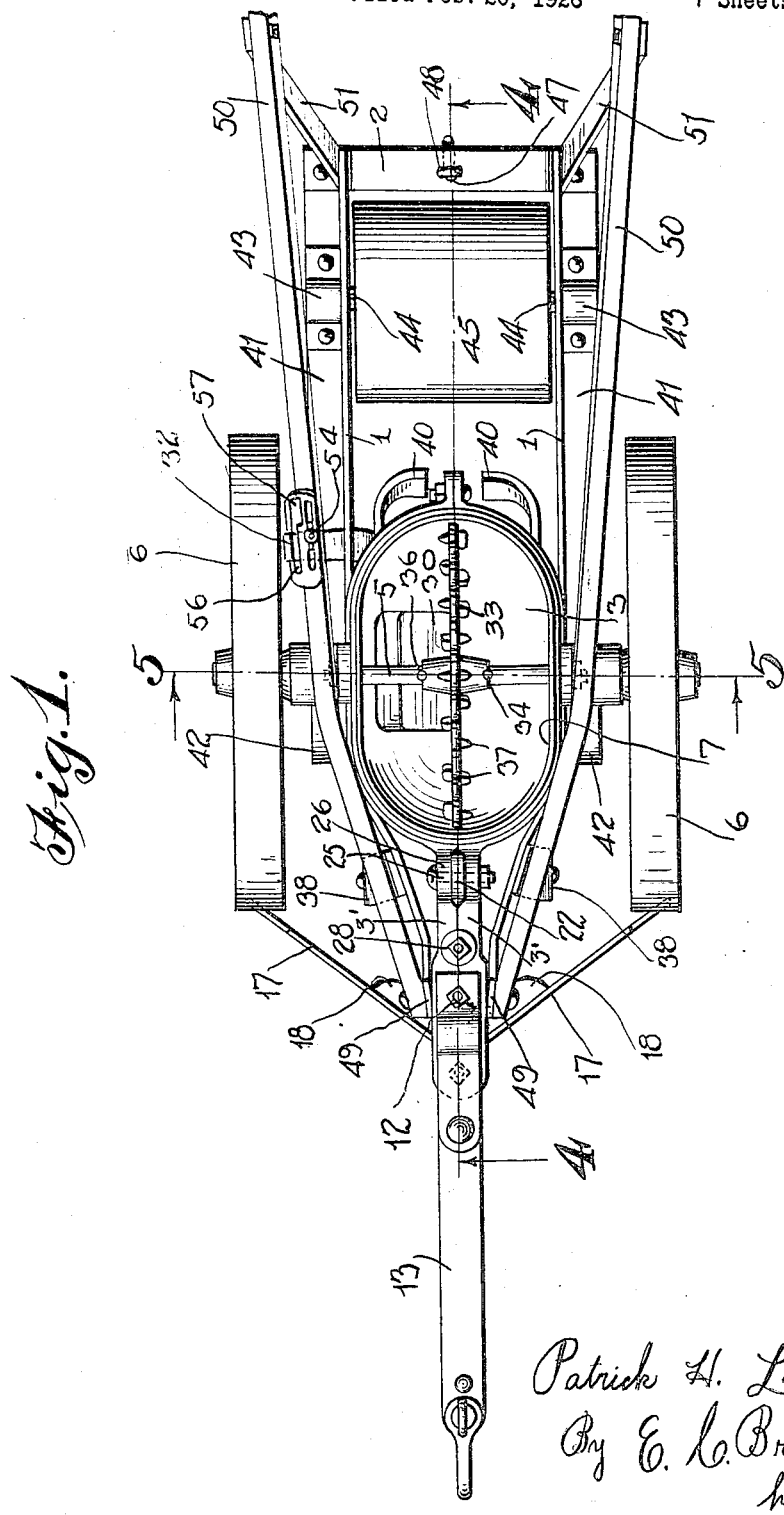

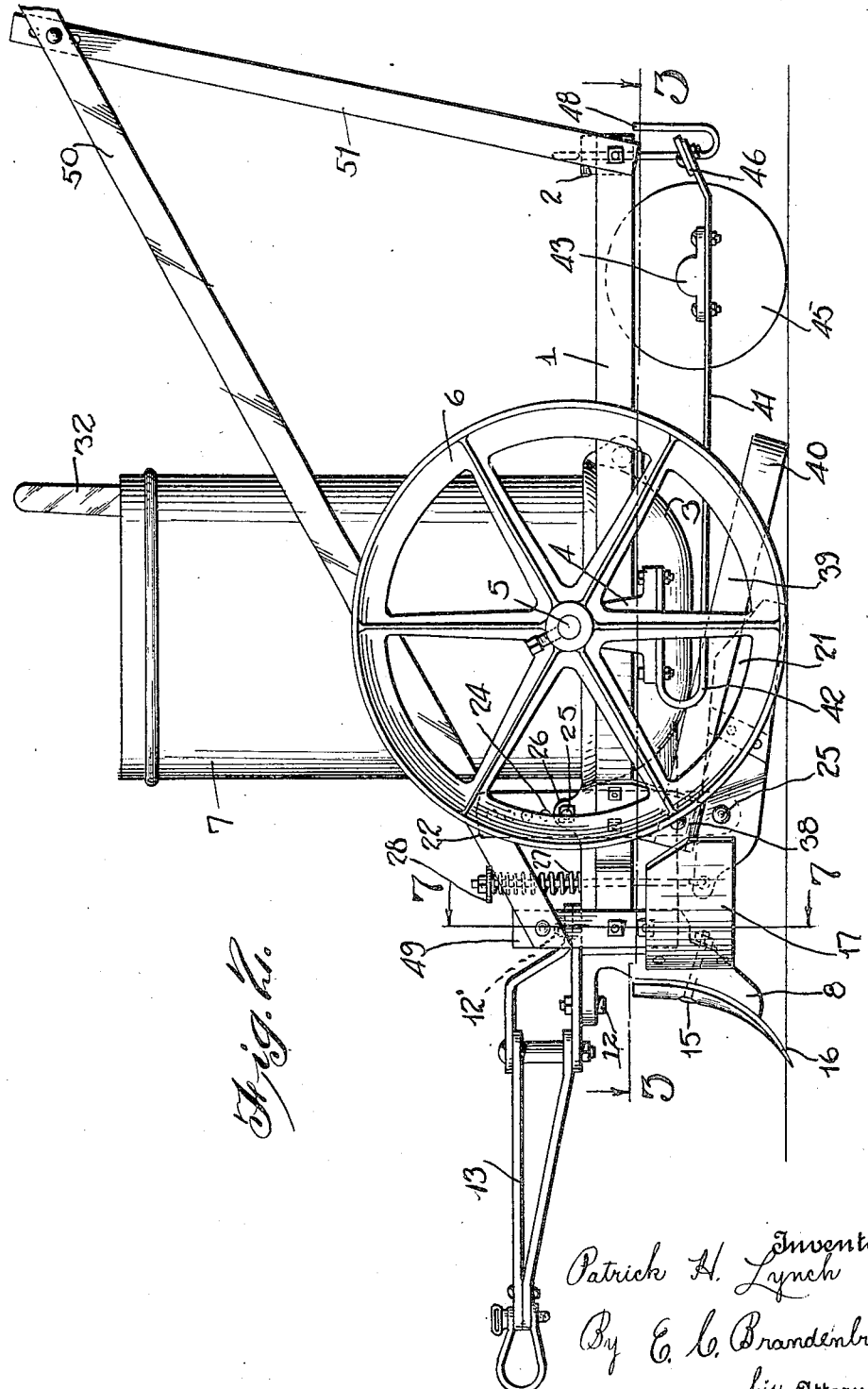

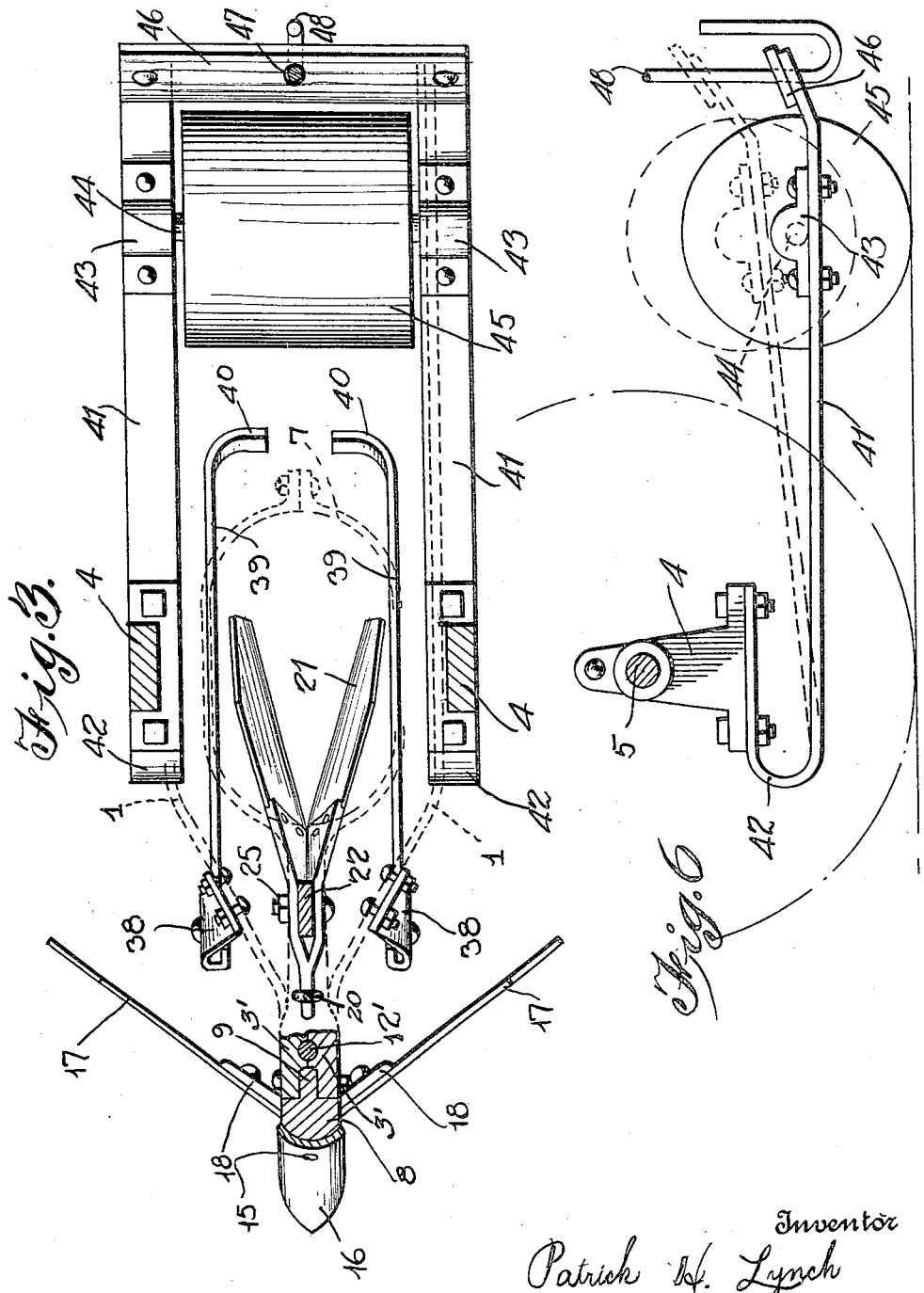

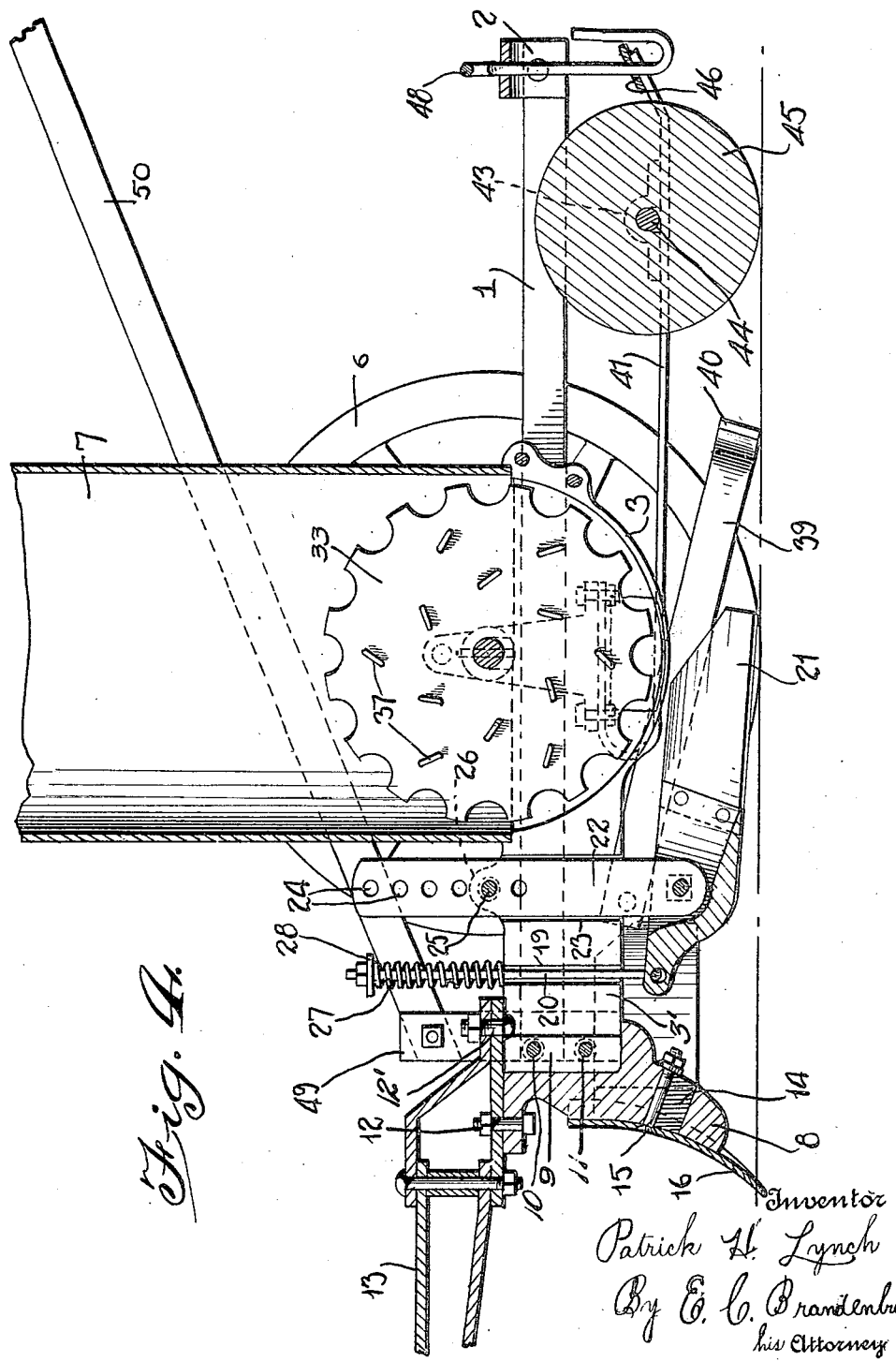

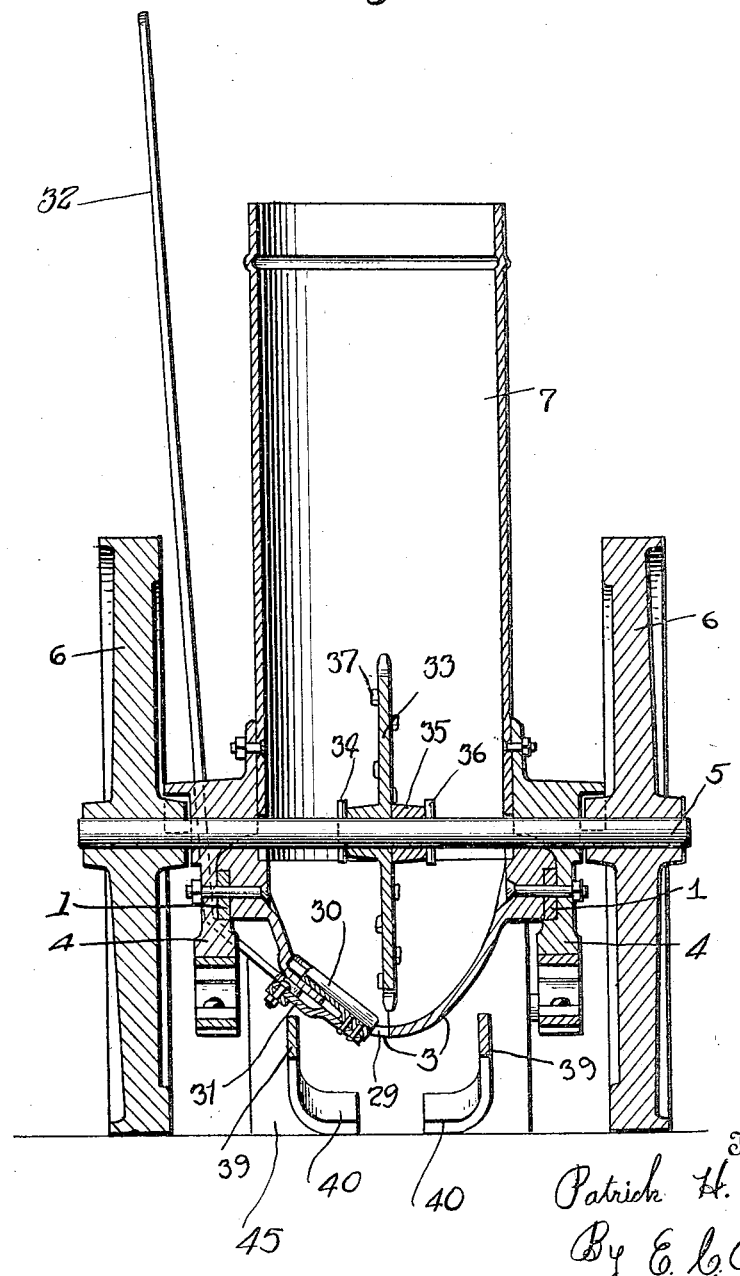

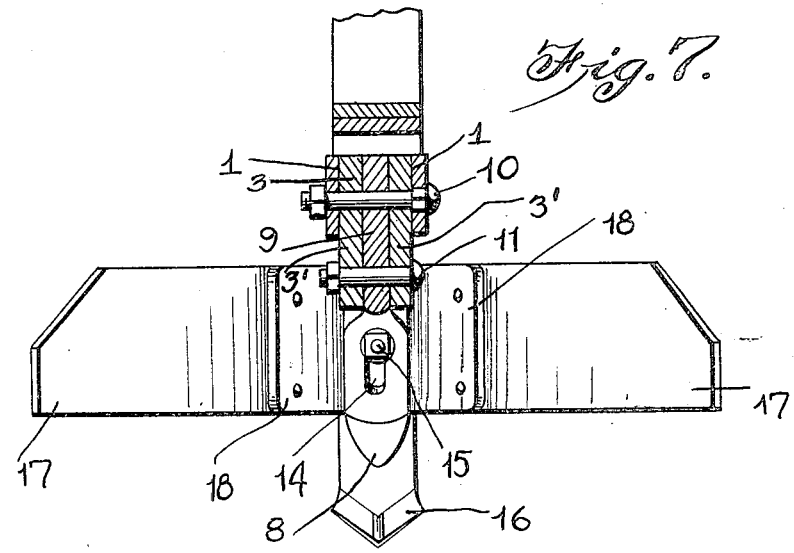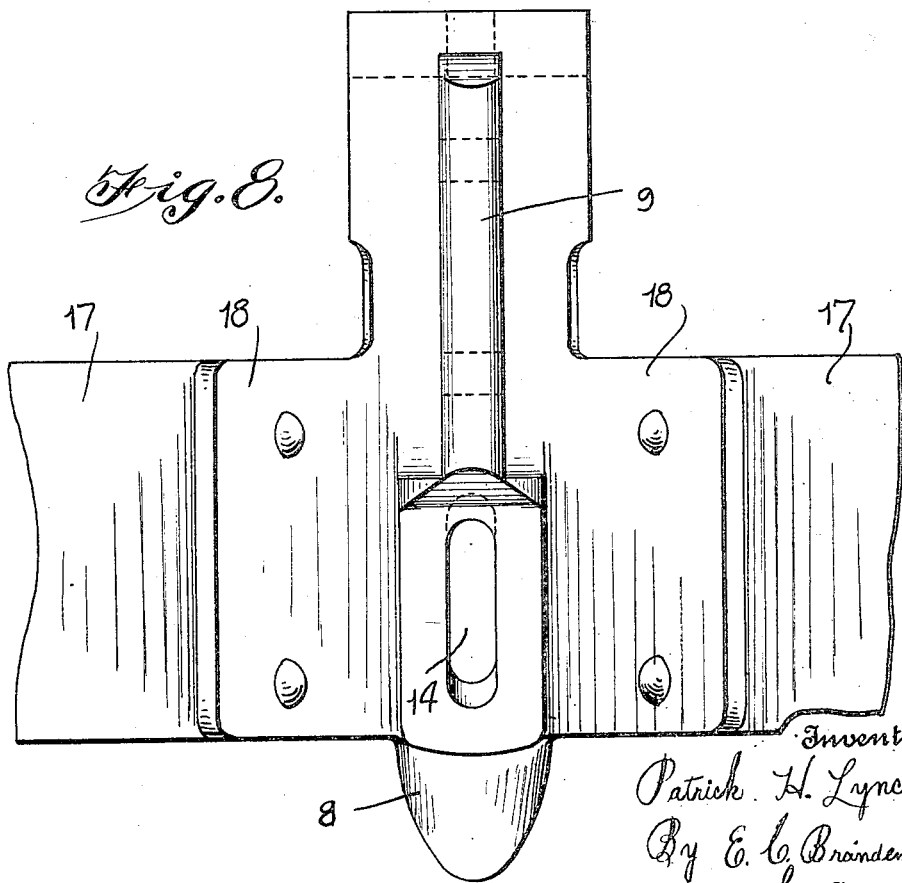

Patented Oct. 23, 1928.

1,688,934

UNITED STATES PATENT OFFICE.

PATRICK H. LYNCH, OF DUNN, NORTH CAROLINA, ASSIGNOR TO THE JOHN A. McKAY MANUFACTURING COMPANY, INC., OF DUNN, NORTH CAROLINA, A CORPORATION OF NORTH CAROLINA.

COTTON PLANTER.

Application filed February 20, 1926. Serial No. 89,791.

This invention relates to an improvement in cotton planters.

The object of the invention is to provide an improved cotton planter which may be made in a very compact form with the smallest number of parts necessary for the proper feeding and planting of the cotton seeds.

A further object of the invention is to provide such a compact form of cotton planter in which the seeds will not clog, and this is provided by reason of the agitator force-feed, which delivers the cotton seeds from the hopper.

With these objects in view, the invention includes a shovel opener-point which is carried at the front end of a frame, upon which frame a drive shaft is mounted, the latter having main wheels attached to the outer ends thereof for supporting the entire frame-work and machine. A hopper extends upward from the frame-work and has a feed disk therein which is keyed to the drive shaft for feeding the cotton seeds from the hopper through an adjustable opening in the bottom thereof, dropping the seeds in the furrow, which is created by the opener-point and by an adjustable shoe which immediately follows the opener-point, the seeds being covered by means of independently pivoted covering drags, and the furrow is then rolled smooth by a leveling roller carried by suitable springs depending from the frame.

In the accompanying drawings:

Fig. 1 is a top plan view of the complete machine;

Fig. 2 is a side elevation of the same;

Fig. 3 is a horizontal sectional view on the line 3—3 of Fig. 2;

Fig. 4 is a longitudinal vertical sectional view on the line 4—4 of Fig. 1;

Fig. 5 is a transverse vertical section on the line 5—5 of Fig. 1;

Fig. 6 is a detail side elevation of the leveler roller and springs carrying the same;

Fig. 7 is a detail sectional view on the line 7—7 of Fig. 2;

Fig. 8 is a rear elevation of the opener casting and scrapers carried thereby;

Fig. 9 is a front elevation of the adjustable feed regulator;

Fig. 10 is a side elevation of the same; and

Fig. 11 is a plan view of the lever set-casting.

The frame of the machine is formed of the longitudinal bars 1, connected together at the rear ends thereof by the transverse bar 2, and the front ends of these bars are secured to the bottom castings 3 on opposite sides thereof. Mounted upon and secured to the castings 3 are suitable journal castings 4, as shown in Fig. 5, which journal castings receive a transverse main drive shaft 5, which passes therethrough and entirely across the machine, the outer ends of said shaft 5 having main wheels 6 secured thereon for supporting the machine. A feed hopper 7 is secured to and extends upwardly from the bottom castings 3 and the journal castings 4.

Extending forwardly from the bottom castings 3 are brackets 3'. At the front end of the brackets 3' and the longitudinal bars 1, an opener casting 8 is mounted. This opener casting 8 has an elongated projection 9 on the rear end thereof, which is slidably received in a groove in the front ends of the brackets 3' and bolts 10 and 11 extend through the parts for securing the opener casting to the frame, the bolt 10 extending through the bars 1, brackets 8', and projection 9, while the bolt 11 extends through the brackets 3' and the projection 9. The opener casting 8 has bolts 12 at its front end extending upwardly therefrom, as shown in Fig. 4. The upper end of the bolts 12 extend through the rear end of a suitable draw-bar 13, for bolting to the opener casting 8 and for attaching draft mechanism to the cotton planter. The rear ends of the draw-bar are brought together and secured by a bolt 12'. The lower end of the opener casting 8 is provided with a slot 14 for receiving a bolt 15 which holds the opener-point 16 to the opener casting. This slot 14 permits of setting the opener-point either shallow or deep, as desired.

As shown in Fig. 8, scrapers 17 are secured to and extend backwardly from projections 18, on opposite sides of the opener casting 8 in order to prevent the soil from being turned up too high in the formation of the furrow.

The bottom castings 3 are provided with registering grooves therein, as shown in Fig. 4, forming an opening 19 for receiving a shoe-hook 20, which extends therethrough and is loosely connected at its lower end to a V-shaped or divided shoe 21, as shown in Figs. 3 and 4. The shoe 21 is carried by a gauge-bar 22, to which said shoe is pivoted, the bar 22 extending upwardly through an opening 23 in the bottom castings 3 and being provided with a plurality of holes 24 for receiving a bolt 25, which passes through one of these holes and through lugs 26, formed on the upper edges of the bottom castings 3. The shoe 21 may be adjusted through the medium of the holes 24 and the bolt 25, formed in the gauge-bar 22, in order to gauge the depth for planting the seed. The upper end of the shoe-hook 20 has a spiral spring 27 sleeved thereon and held between a washer 28 secured on the upper end of the shoe-hook 20 and the upper surface of the bottom castings 3.

The bottom castings 3 are made substantially concave as shown in Fig. 5, and one of these castings is provided with an opening 29 therein for receiving a movable slide 30, which is connected to a pivoted lever casting 31, and to which an operating lever 32 is attached in order to adjust the slide 30 back and forth in the opening 29, for regulating the amount of seed which is fed from the hopper 7. A toothed feed wheel 33 is keyed to the main drive shaft 5 by a key 34 in one side and a separate hub 35 is keyed to said shaft 5 by means of a key 36, the separate hub 35 being independent of the feed wheel 33 but limiting the movement thereof in one direction. The feed wheel 33 has flat or oval shaped lugs 37 cast integral therewith and extending laterally on opposite sides thereof for carrying the seed to the feed opening 29 at the lower end of the bottom castings 3.

The longitudinal bars 1 have brackets 38 bolted thereto as indicated in Fig. 3, and covering drags 39 are pivoted to the brackets 38, the rear end of the drags 39 being bent inwardly toward each other as at 40 for covering the seed after it has been fed into the furrow. It will be noted that the drags 39 are pivoted independently of each other so that if one of the drags should be raised by means of a clod or other obstruction, the other drag would cover the seed in the furrow, thus eliminating the usual waste of seed by reason of part of it not being covered.

The journal castings 4, which are mounted upon the main drive shaft 5, extend beneath the longitudinal bars 1 and have long roller springs 41 secured thereto, the roller springs 41 being bent back upon themselves at their front ends 42, which backwardly bent ends are secured to the journal castings 4. The roller springs 41 have roller boxes 43 mounted thereon adjacent the rear ends thereof which roller boxes receive a transverse shaft 44 which carries a wooden leveler roller 45 for rolling over the covered seed and leveling the ground. The rear ends of the roller springs 41 are connected together by means of a bar 46, which is provided with an opening 47 therein, for receiving the hook 48 supported by and depending from the transverse bar 2 of the main frame.

The springs 41 allow the roller 45 to swing upward, in order to easily ride over the surface of the soil, but these springs are strong and will normally tend to press the roller down against the soil for smoothing the same over the furrow, but the upward and downward movements are guided by means of the hook 48.

At the front ends of this machine, bars 49 are secured, to which are attached the handles 50 for directing and guiding the machine, the handles 50 being braced at the rear ends thereof by suitable braces 51, which are adjustably connected with the handle as indicated in Fig. 2.

As shown in Fig. 11, a lever set casting 52 is mounted upon one of the handles 50 and has an elongated slot 53 therein for receiving a bolt 54 carried by the handle 50, and said casting 52 is adjustable along the handle 50 and held in its adjusted position by means of a wing-nut 55. The casting 52 projects over the inside of the handle 50 and has an elongated slot 56 therein for receiving the operating lever 32. The slot 56 has an offset portion 57 at the rear end thereof in order to hold the slide 30 in an open position, or, to effect an adjustment of this slide.

In operation, any source of draft power may be applied to the draw-bar 13 for pulling the machine over the ground, in which it is desired to plant the cotton, the opener-point 16 creating a furrow which is regulated and definitely maintained by means of the shoe 21, and, by reason of the rolling action of the main wheels 6, the main drive shaft 5 will be rotated causing a rotation of the feed disk 33, which feeds the cotton seed down through the opening 29 in the bottom of one of the castings 3, allowing the cotton seeds to drop into the furrow, where they are covered with soil by means of the inturned rear ends of both or of one of the covering drags 39, and the spring pressed roller 45 rolls the soil down smoothly and compactly over the seed; thus insuring that all of the seed will be covered with soil in order to prevent the wasting of any of the seed by reason of its not being covered. The adjustability of the opener-point 16, the shoe 21, and of the regulator slide 30, permits of these parts being moved to regulate the depth of the furrow and the amount of seed fed thereinto in accordance with the operator's desire. By reason of the covering drags 39 being pivoted independently of each other and the fact that the roller 45 is carried by strong springs, these parts are free to conform to the unevenness of the land while at the same time they serve to effectively and securely cover the seed after it has been fed into the furrow.

I claim:

1. In a machine of the character described, the combination of a main frame, divided castings bolted together, brackets extending forwardly from said castings, an opener casting suspended from the forward end of said brackets, a plow point secured thereto, and means for securing the opener casting, brackets, and the main frame together.

2. In a machine of the character described, the combination of an axle, journal castings supported upon the axle, a main frame carried by said journal castings, divided castings secured to the journal castings and bolted together, brackets extending forwardly from said divided castings, an opener casting suspended from the forward ends of said brackets, a plow point secured thereto, and means for securing the opener casting brackets and the main frame together.

3. In a machine of the character described, the combination of a wheeled axle, journal castings supported upon the axle, a main frame carried by said journal castings, and closed at the rear end, divided castings secured to the journal castings and bolted together, brackets extending forwardly from said divided castings, an opener casting suspended from the forward ends of said brackets, a plow point secured thereto, and means for securing the opener casting, brackets, and the forward end of the main frame together.

4. In a machine of the character described, the combination of a frame, a plow member carried by said frame near the front thereof, an adjustably mounted divider shoe suspended from the frame rearwardly of said plow member, resilient tensioning means connected with said shoe, seed feeding means mounted on the frame and having a point of discharge closely behind the shoe, covering drags independently pivoted to the frame, and disposed behind the point of discharge for covering the seed, and a resiliently mounted covering roller located behind the drags.

5. In a machine of the character described, the combination of a frame, a furrow opener member carried by the frame near the front thereof, a divider shoe suspended from the frame rearwardly of the furrow-opener, means for adjusting the position of the shoe relative to the frame, seed feeding means mounted on the frame and having a point of discharge closely behind the shoe, pivotally mounted covering drags disposed behind the point of discharge for covering the seed, and a resiliently mounted covering roller located behind the drags.

6. In a machine of the character described, the combination of a frame, a furrow opener member carried by the frame near the front thereof, a divider shoe suspended from the frame rearwardly of the opener member, a gauge bar adjustably carried by the frame and suspending the shoe therefrom, means for adjustably connecting the gauge bar to the frame, a rod connected with the shoe and extending through the frame, resilient tensioning means connected with the rod, seed feeding means mounted on the frame and having a point of discharge closely behind the shoe, and means carried by the frame for covering the seed.

In testimony whereof I affix my signature.

PATRICK H. LYNCH.